United States Patent [19]

Miyao

[11] 4,091,690
[45] May 30, 1978

[54] METHOD FOR CONTROLLING CONTINUOUSLY VARIABLE DRIVE RATIO TRANSMISSIONS AND A SYSTEM THEREFOR

[75] Inventor: Takayuki Miyao, Hiratsuka, Japan

[73] Assignee: Aisin Seiki Kabushiki Kaisha, Kariya, Japan

[21] Appl. No.: 727,599

[22] Filed: Sep. 28, 1976

[51] Int. Cl.² .................. B60K 17/00; B60K 19/14; B60K 21/00

[52] U.S. Cl. .......................... 74/865; 74/867; 74/868

[58] Field of Search ................... 74/865, 867, 868

[56] References Cited

U.S. PATENT DOCUMENTS

| | | | |
|---|---|---|---|
| 3,913,418 | 10/1975 | Miyao et al. | 74/865 X |
| 3,927,528 | 12/1975 | van der Kolk et al. | 74/865 X |
| 3,952,614 | 4/1976 | Iijima | 74/865 |

*Primary Examiner*—Leonard H. Gerin
*Attorney, Agent, or Firm*—Finnegan, Henderson, Farabow & Garrett

[57] ABSTRACT

A continuously variable drive ratio transmission for motor vehicles is interposed between a prime mover and a drive shaft. When a single foot pedal is depressed the prime mover is brought to the driving condition thereof so as to drive the vehicle. When the single foot pedal is released the drive ratio of the transmission is decreased and the prime mover is brought to the braking condition thereof in response to the releasing of the pedal so as to apply the dynamic brakes on the vehicle. The depression and release of the foot pedal, respectively, rotate first and second cams incorporating cam surfaces representing desired speeds of the prime mover for any pedal setting. Hydraulic pressure is used to detect the operational position of the pedal, to activate a changeover valve for selecting a first or second piston, respectively, controlled by the cams in accordance with the position of the pedal, for comparing the speed of the engine with the position of the selected piston, and for varying the drive ratio between the prime mover and the drive shaft until the difference between the speed of the engine and the desired speed represented by the cam surface is reduced to a null.

4 Claims, 11 Drawing Figures

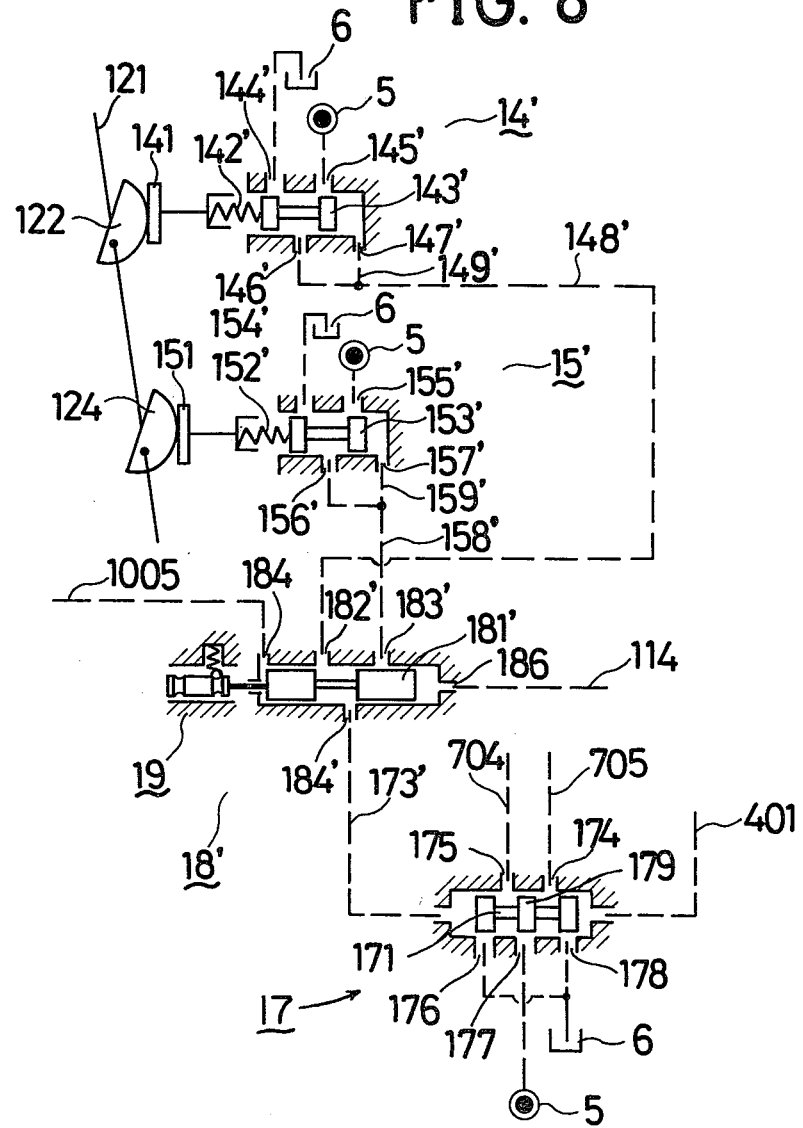

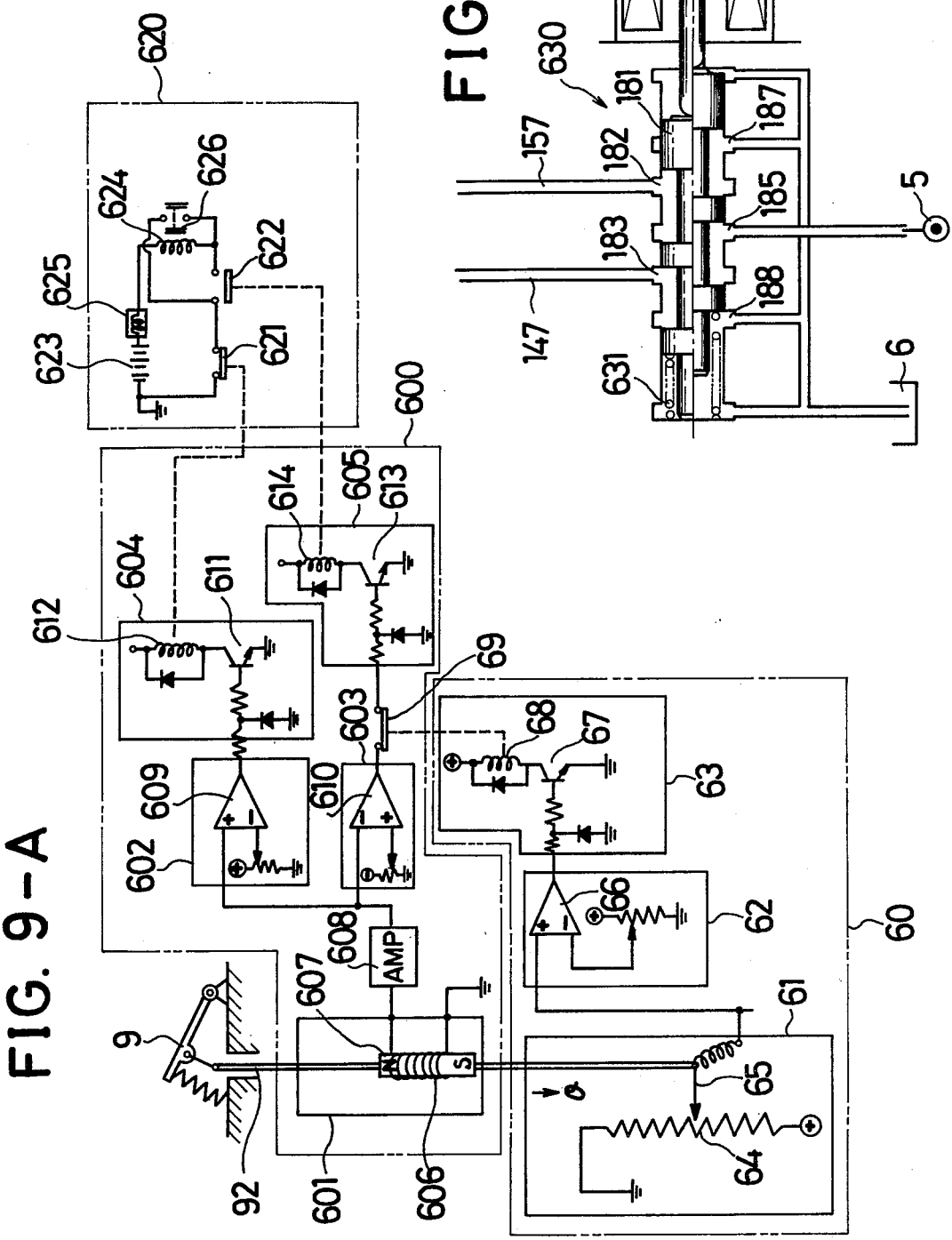

4,091,690

METHOD FOR CONTROLLING CONTINUOUSLY VARIABLE DRIVE RATIO TRANSMISSIONS AND A SYSTEM THEREFOR

BACKGROUND OF THE INVENTION

1. Field of the Invention

This invention relates to a method for controlling continuously variable drive ratio transmissions and a system therefor. More particularly, this invention relates to an improvement in controlling the continuously variable drive ratio transmission which is being employed in the driving system of vehicles driven by means of output power of an internal combustion engine.

2. Description of the Prior Art

According to the turbo-torque converter generally known as the continuously variable drive ratio transmission, the drive ratio is determined at each of its operating conditions. However, the continuously variable drive ratio transmission with which this invention is concerned is adapted to the conventional mechanical or hydraulic transmission of the continuously variable drive ratio which may be freely controlled outside of the transmission. The control of such transmission in accordance with the invention only by a single pedal will realize the use of the most effective zone of the internal combustion engine when the engine is utilized for driving the vehicle and the maximum dynamic braking generally referred to as "engine braking" when necessary.

It is a conventional practice to utilize the hydraulic transmission for effectively applying the dynamic brake. According to the conventional practice, it is necessary to provide a pedal exclusively for use in dynamic braking. Alternatively, the dynamic brake is applied by the depression of one foot pedal at the idle stage and then the usual mechanical brake is applied by the depression thereof at the further stage.

One of the features of this invention resides, however, in that the dynamic brake may be applied in proportion to the return of the acceleration pedal for driving the vehicle, after being depressed.

Before the explanation of the invention in detail, the relevant principles of operation of the internal combustion engine will be described. It is well known that the operational point of the internal combustion engine is determined when two of the following three conditions are determined: the output torque of the engine, the rotational speed thereof, and the depression of the acceleration pedal. More specifically, with reference to FIG. 1 wherein the characteristic of gasoline engine is shown, the vertical axis therein reflects the output horse power (PS) of the gasoline engine, while the horizontal axis reflects the rotational speed (rpm). In FIG. 1, the straight line T represents the characteristic of the constant output torque of the gasoline engine, the curve $\theta$ represents the throttle degree proportional to the depression of acceleration pedal, and the curve $l$ represents the line reasonably interconnecting a point desirable for attaining the minimum fuel consumption at each throttle degree. Another curved line similar to the line $l$ may be drawn in accordance with the various purposes other than the fuel consumption purpose, for instance, for the purpose of attaining the minimum exhaust of $NO_x$ or $Co$. It is, therefore, to be noted that the drive condition of each internal combustion engine may be selected for achieving each purpose so that the engine can be operated in the most desirable way.

In accordance with the above, when the throttle degree is given, the engine operational point P will be determined by setting the rotational speed thereof to the point indicated as "$no$". In addition, the throttle degree $\theta$ is proportional to the vacuum pressure of the engine throttle which may represent the amount of depression of the acceleration pedal. The output torque T of the gasoline engine is proportional to the oil pressure of the hydrostatic transmission.

In order to maintain the engine operation along the line $l$, the drive ratio of the continuously variable drive ratio transmission may be so set that the difference between $no$ and $na$ is normally zero, $no$ being the command rotational speed at which the line $l$ and the line $\theta$ are crossed such as at the point P and $na$ being the rotational speed at which the engine is actually operated at the corresponding throttle degree such as at the point $a$.

FIG. 2 shows how the dynamic brake is conventionally applied by releasing the acceleration pedal, as disclosed in U.S. Pat. No. 3,913,418 granted on Oct. 21, 1975 to Miyao and Sakai.

In FIG. 2, the vertical axis shows the output horse power (PS) of the gasoline engine, the horizontal axis shows the rotational speed $n$(rpm) thereof, the currves $\theta$ show throttle degree, and the line $l$ shows the minimum fuel consumption as in FIG. 1. When the line $l$ is within the zone above the horizontal axis, it means the engine is operated for driving, while when the line $l$ is within the zone below the horizontal axis, it means the engine is operated for dynamic braking. As seen, the line $l$ is continuously single from the drive zone to the dynamic brake zone so that the dynamic brake is applied when the throttle degree approaches $\theta o$.

According to the method as disclosed in FIG. 2, however, when the line $l$ is set so as to pass the point C wherein the maximum horse power is generated at the maximum throttle degree $\theta m$ and the point B wherein the maximum dynamic brake is applied at the minimum throttle degree $\theta o$, the deflecting portion 2005 of the graph of the degree of throttle opening thereof becomes too sharp as seen. Therefore, it is practically difficult in the design of the engine to get the command engine rotational speed $no$ at the corresponding throttle degree $\theta$. In addition, the angle $\alpha$ between the throttle degree $\theta$ and the line $l$ at the dynamic brake zone is relatively small so that a slight change of the throttle degree $\theta$ may unavoidably result in the considerable change of the command rotational speed $no$.

SUMMARY OF THE INVENTION

It is, accordingly, one of the objects of the invention to provide a new and improved method for controlling continuously variable drive ratio transmissions and a new and improved system therefor wherein the above-mentioned drawbacks of the prior art may be overcome.

The features of the invention will be summarized with reference to FIG. 3.

In FIG. 3, the vertical axis shows the engine output horse power (PS), and the zone above the horizontal axis which indicates the engine rotational speed shows the engine driving condition while the zone below the horizontal axis shows the dynamic braking zone, as in FIG. 2. The line 3003$a$ for driving the engine is independent of the line 3003$b$ for applying the dynamic brake as seen, to thereby eliminate the sharp deflecting point such as the point 2005 of FIG. 2 and make the angle α between θ and 3003b in the braking zone of FIG. 3 larger than the angle α between θ and l in the braking zone of FIG. 2.

When the throttle degree is constant, the engine is in the driving condition at the point F of FIG. 3, and the rotational speed is na, then the engine is on the line 3003a by movement of the point F to the point E. In order to get such a preferable result, the drive ratio of the transmission may be increased to increase the load of engine so that the engine rotational speed is decreased to no from na. On the contrary, when the actual speed na is smaller than the command speed no, the drive ratio of the transmission may be decreased to decrease the engine load until the speed na is equal to the speed no.

Similarly as to the line 3003b, it is desirable to transfer the point J to the point H by decreasing the drive ratio until na is equal to no. When na is larger than no, the drive ratio may be increased to effect the result.

It is to be noted that two of the three elements of the throttle degree, the engine torque and the engine rotational speed will control the engine operation. Therefore, the combination of the throttle degree and the engine torque will control the engine operation as disclosed in FIG. 3. When the actual torque Ta is smaller then the command torque To, the drive ratio is increased to increase the torque Ta until Ta is equal to To at the point E. On the contrary, when Ta is larger than To, the drive ratio is decreased.

With reference to FIG. 4 wherein the throttle degree and the engine rotational speed are employed to control the engine, there is shown the relationship between the throttle degree θ and the command rotational speed no in accordance with the lines 3003a and 3003b.

In FIG. 5, when the throttle degree θ is given, the throttle degree θ is converted to the command engine torque To so that the actual engine torque Ta is converted to the torque To. In this embodiment, the line 3003a may be modified as the line 3003a' in which the line K - L is of the constant command torque.

FIG. 6 shows the relationship between the engine torque T and the command engine rotational speed no. The line 3003a" is similar to the line 3003a' of FIG. 5.

However, in the preferred embodiments described hereinbelow, the throttle degree is converted to the command engine rotational speed to be compared with the actual engine rotational speed, thereby controlling the engine.

Another object of the invention is to provide a method and a system for controlling continously variable drive ratio transmissions which may reduce fuel consumption to a minimum level with very little harmful gas contained in the exhaust.

These and other objects and advantages will become apparent from the following detailed description taken in connection with the accompanying drawings.

BRIEF DESCRIPTION OF THE DRAWINGS

FIG. 8 is a schematic view of another embodiment of servo means shown in FIG. 7;

FIGS. 9A and 9B are respectively schematic views of another embodiment of detecting means and changeover valve shown in FIG. 7.

DETAILED EXPLANATION OF THE PREFERRED EMBODIMENTS

Figure 7:
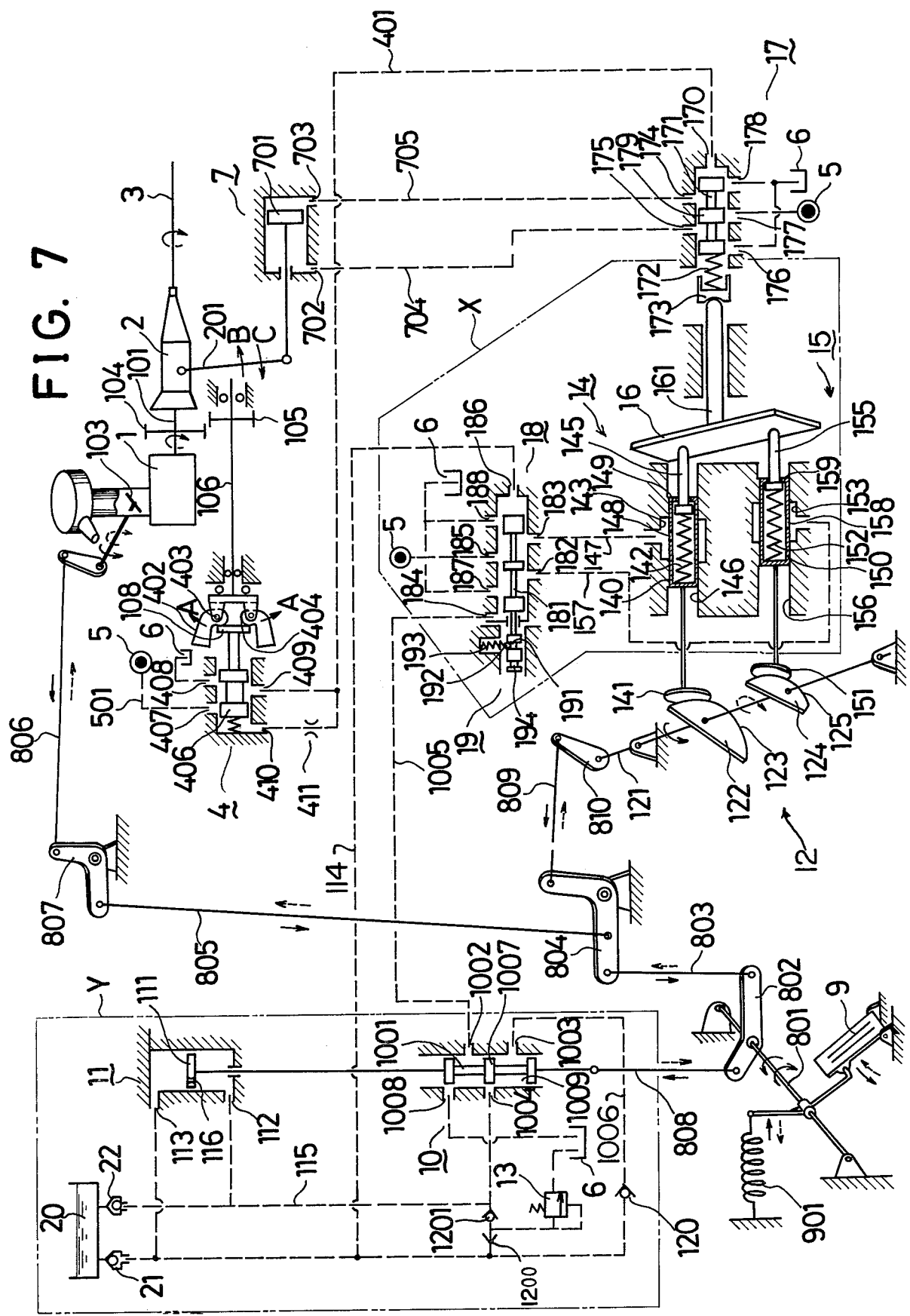
FIG. 7 is a schematic view of one embodiment according to the invention.

With reference to FIG. 7 wherein a continuously variable drive ratio transmission 2 is driven by a drive shaft 101 of a prime mover, such as a gasoline engine 1. An output shaft 3 of the transmission 2 drives the wheels of an automobile, or other vehicle, not shown. A gear 104 is secured to the drive shaft 101 of the gasoline engine 1 and a gear 105 is in mesh with the gear 104. The gear 105 is secured to a rotational shaft 106 which drives a well known governor 4. The governor 4 supplies oil pressure corresponding to the rotational speed of the gasoline engine 1 to a conduit 401. Governor weights 402 are unfolded about respective pins 403 in the direction indicated by arrows A by centrifugal force generated by the rotation of the rotational shaft 106, whereby cam surfaces 404 of the governor weights 402 urge a cam following plate 108 secured to one end portion of the spool 406 toward the left in the drawing. As a result, the governor weights 402 urge a spool 406 to the left. A port 408 fluidically connected to a reservoir 6 is gradually closed while a port 407 is gradually opened, according to the leftward movement of the spool 406. Therefore, oil pressure generated in a constant pressure source, such as pump 5, which generates oil pressure of the order of about 10 kg/cm² constantly, is supplied through a conduit 501 and the port 407 to a port 409. The oil pressure supplied to the port 409 flows into a port 410 through an orifice 411 to act as a feedback signal which urges the spool 406 to the right. Therefore, the port 407 is gradually restricted, while the restriction of the port 408 is gradually released again such that the pressures in the ports 409 and 410 are lowered, respectively.

The movement of the spool 406 is controlled by the balance between the force urging the spool 406 to the right which is generated by the oil pressure in the port 410 and the force urging the spool 406 to the left which is generated by the governor weights 402 such that the degree of the restriction of the port 407 is determined and the volume of the oil pressure in the conduit 401 is also determined.

It is well known that the balance between the force urging the spool to the right and the force urging the same to the left is determined by the planning value of the governor weights 402 and an effective area of the left end of the spool 406.

It is also well known that the value of the oil pressure in the conduit 401 is proportional to the rotational speed of the rotational shaft 106.

If a lever 201 of the transmission 2 is moved to the right as indicated by arrow B, a drive ratio will be decreased, and if the lever 201 is moved to the left as indicated by arrow C, the drive ratio will be increased. The term "drive ratio" is a value arrived at by dividing N₂ which shows rotational speed of the output shaft 3 of the transmission 2 by na which shows the actual rotational speed of the output shaft 101 of the engine 1. The lever 201 is moved by means of an actuator 7. When oil pressure is delivered to a port 702 through a conduit 704, the oil pressure acts on the left end of a piston 701 to urge the piston 701 to the right, thus displacing the lever 201 in the direction indicated by arrow B. On the contrary, when oil pressure is delivered to a port 703 through a conduit 705, the oil pressure acts on the right end of the piston 701 to urge the piston 701 to the left, thus displacing the lever 201 in the direction indicated by arrow C.

A pedal 9 is operatively connected to a throttle valve 103 through a link mechanism comprising a shaft 801, bell crank 802, link 803, bell crank 804, link 805, bell crank 807 and a link 806. The throttle degree of the throttle valve 103 increases as the degree of depression of the pedal 9 increases. Where the pedal 9 is brought back to its normal position by a return spring 901, the throttle degree is zero. The pedal 9 is connected to a cam shaft 121 of a converter 12 through the shaft 801, bell crank 802, link 803, bell crank 804, a link 809 and a lever 810.

Figure 4:
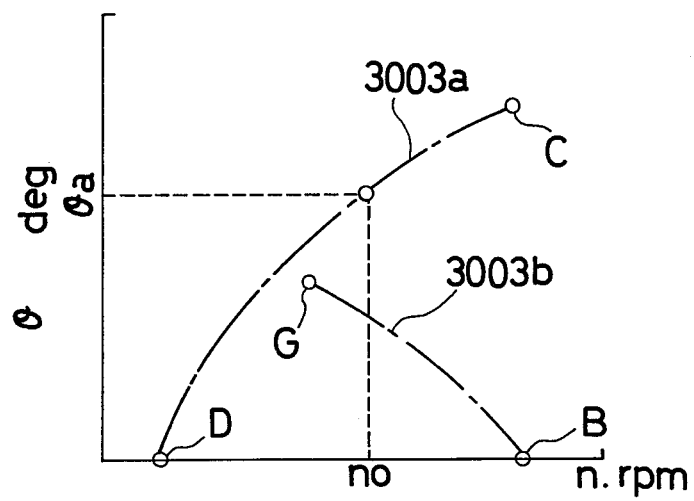
Figure 5:
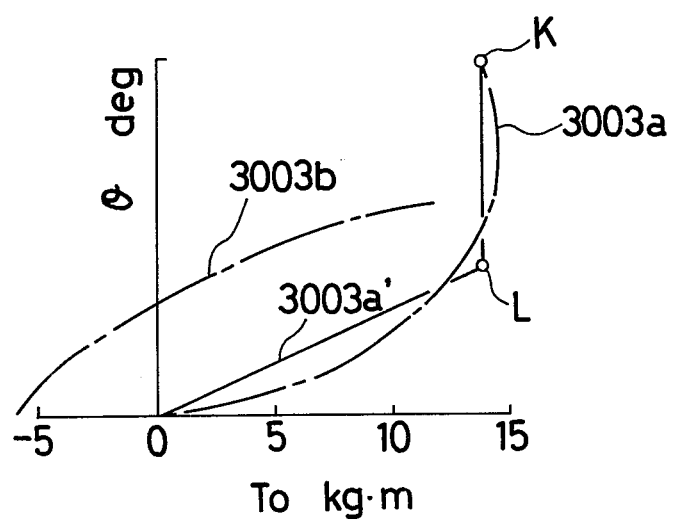
Figure 6:
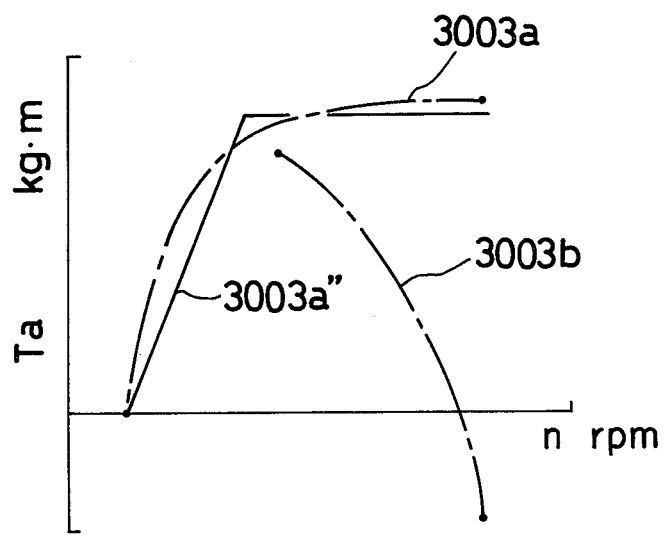

The cam shaft 121 is rotated in the counterclockwise direction in the drawing by depressing the pedal 9 when the engine 1 is to be driven, and the cam shaft 121 is rotated in the clockwise direction by releasing the pedal 9 when the dynamic braking is to be applied. A first cam 122 and a second cam 124 are secured to the cam shaft 121. A first cam follower 141 and a second cam follower 151 are engaged with a first cam surface 123 of the first cam 122 and a second cam surface 125 of the second cam 124, respectively, so as to move together with the respective first and second cam surfaces 123 and 125. The rotational angle of the cam shaft 121 represents the throttle degree $\theta$ indicated on the axis of ordinate in FIG. 4, and the degrees of the axial movement of the first and second cam followers 141 and 151 represent degree of the rotational speed of the engine no indicated on the axis of abscissa in FIG. 4. The shapes of the first and second cam surfaces 123 and 125 are represented as functions of lines 3003a and 3003b, respectively, in FIG. 4.

A servo valve 17 comprises first servo means 14 and second servo means 15, the first and second servo means 14 and 15 being identical in construction and being disposed in parallel. The first servo means 14 includes a slidable member 140 secured to the first cam follower 141, a plunger 145 axially slidably disposed within the slidable member 140, a spring 142 disposed within the slidable member 140 to normally urge the plunger 145 to the right, a shoulder 149 provided at the right end of the slidable member 140 to regulate the rightward movement of the plunger 145, and a cylinder 146 within which the slidable member 140 and the plunger 145 are slidably disposed as one body. An annular groove 143 and a slot 148 are, respectively, provided within the interior wall of the cylinder 146 and the wall of the slidable member 140, through which the interior space of the slidable member 140 is always fluidically connected to a conduit 147 which is fluidically connected to a port 183 of a changeover valve 18.

The second servo means 15 is identical in construction to the first servo means 14, and a groove 153 is fluidically connected to a port 182 of the changeover valve 18 through a conduit 157.

The plunger 145 and a like plunger 155 of the second servo means 15 are normally in contact with a plate 16. The end of a projection 161 of the plate 16 is in contact with a spring retainer 173 retaining a spring 172 which urges the spool 171 to the right, the constant of spring 172 being stronger than the constant of springs 142 and 152. The oil pressure generated in the governor 4 which is in proportion to the rotational speed of the engine 1 is supplied to a port 170 through the conduit 401 to urge the spool 171 to the left. When the force urging the spool 171 to the right and the force urging the same to the left are equal, a port 177 is completely closed by a land 179 of the spool 171. When the force urging the spool 171 to the right is larger than the force urging the spool 171 to the left, the spool 171 is urged to the right to establish a fluid communication between a port 175 and the port 177, whereby the oil pressure generated in the pump 5 is delivered to the port 702 of the actuator 7 through the conduit 704, thus urging the piston 701 to the right resulting in the decrease of the drive ratio of the transmission 2. At this time, the oil pressure in the port 703 of the actuator 7 is drained through the conduit 705 and ports 174 and 178 to the reservoir 6.

On the contrary, when the force urging the spool 171 to the left is larger than the force urging the same to the right, the spool 171 is urged to the left to establish a fluid communication between the port 177 and the conduit 705, whereby the oil pressure generated in the pump 5 is delivered to the port 703 of the actuator 7 through the conduit 705, thus urging the piston 701 to the left resulting in the increase of the drive ratio of the transmission 2.

The pedal 9 is further connected to a spool 1001 of a throttle degree detecting valve 10 and a piston 111 of a pedal speed responsive device 11 via shaft 801, bell crank 802 and a link 808.

Figure 1:
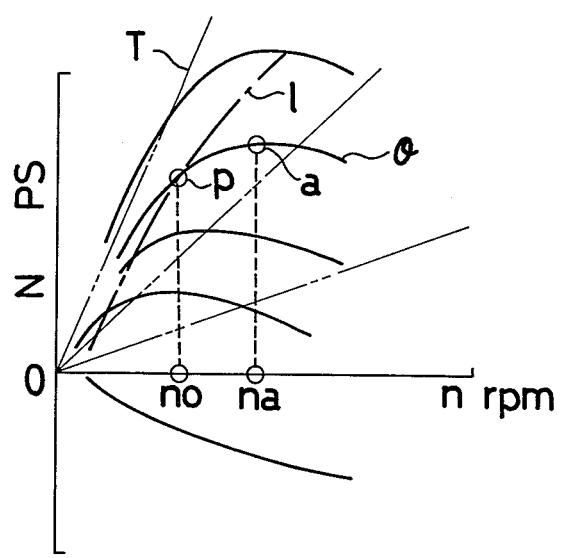
FIGS. 1 to 6 are diagrams each showing an engine characteristic and a control method therefor.
Figure 2:
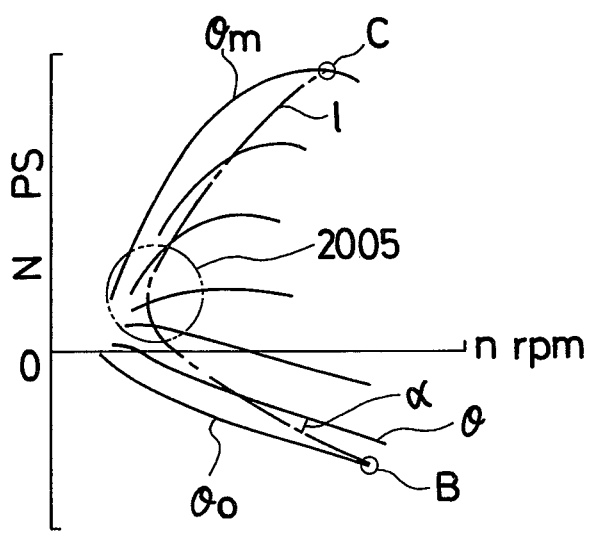
Figure 3:
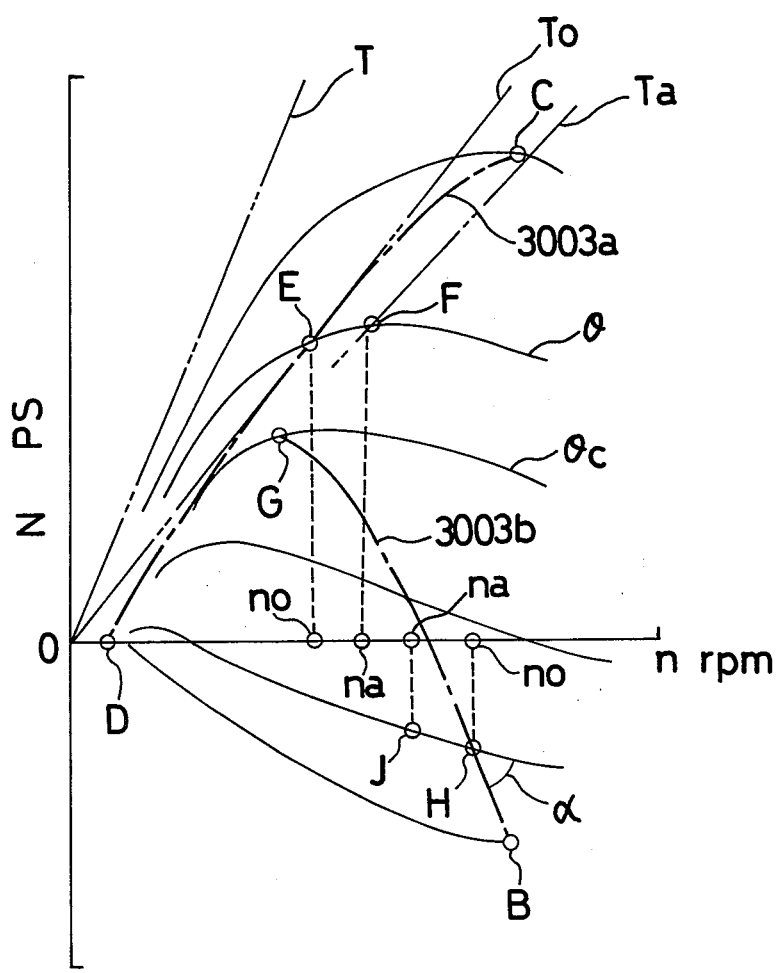

When the spool 1001 of the throttle degree detecting valve 10 is placed at $\theta = \theta c$ in FIG. 3, a port 1004 is closed by a land 1007 of the spool 1001. When the throttle degree $\theta$ is larger than $\theta c$, the spool valve 1001 is moved upwardly and the port 1004 and a port 1002 are fluidically connected to a port 1003 and a port 1008, respectively. When the throttle degree $\theta$ is smaller than $\theta c$, the spool valve 1001 is downwardly moved and the port 1004 is always fluidically connected to the port 1002 and the port 1003 is closed by the spool valve 1001. The port 1002 is fluidically connected to a port 184 of the changeover valve 18 via a conduit 1005 and the port 1003 is fluidically connected to a conduit 114 via a conduit 1006 and a check valve 120, and the port 1004 is fluidically connected to a conduit 115.

A spool valve 181 of the changeover valve 18 is operatively contacted with a detent 19 which comprises a ball 192, a spring 193 and grooves 191 and 194. When the oil pressure is supplied through the conduit 114 to a port 186, the spool 181 is moved to the left, whereby the ball 192 is pushed into the groove 191 by the spring 193 to fix the spool 181. When the oil pressure is supplied through the conduit 1005 to the port 184, the spool 181 is moved to the right, whereby the ball 192 is pushed into the groove 194 by the spring 193 to fix the spool 181. At this time, even if the oil pressure in the port 186 or the port 184 is lowered, the spool 181 is kept at the settled position by the detent 19 and serves so-called flip-flop operation. When the spool 181 is moved to the left and the ball 192 is in the groove 191, the ports 182 and 183 are fluidically connected to ports 187 and 185, respectively, as shown in FIG. 7, and the oil pressure in a slidable member 150 in the second servo means 15 is drained through the port 153, conduit 157, and ports 182 and 187 to the reservoir 6, whereby the plunger 155 is capable of moving to the left against a spring 152.

While the oil pressure generated in the pump 5 is supplied into the slidable member 140 of the first servo means 14 through ports 185 and 183, conduit 147, groove 143 and the slot 148, the first plunger 145 is moved to the right until the rightward movement thereof is regulated by the shoulder 149 of the slidable member 140, and the plate 16 is displaced to the right by the first plunger 145. At this time, as the first plunger 145 and the first slidable member 140 are moved as one body, the first cam follower 141 and the plunger 145 are moved as one body. On the contrary, when the spool 181 is moved to the right and the ball 192 is in the groove 194, the ports 182 and 183 are fluidically connected to ports 185 and 188, respectively, such that the oil pressure in the first slidable member 140 is drained to the reservoir 6 through the slot 148, groove 143, conduit 147 and the ports 183 and 188, whereby the movement of the first cam follower 141 is not transferred to the plunger 145.

While the oil pressure generated in the pump 5 is supplied into the second slidable member 150 through the ports 185 and 182, conduit 157, groove 153 and a slot 158, the second cam follower 151 and the second plunger 155 are moved as one body.

The piston 111 of the pedal speed responsive device 11 is provided with a restriction 116, by which the great pressure difference between the pressure in a port 112 and that in a port 113 is not produced while the movement speed of the piston 111 is slow. The ports 112 and 113 are fluidically connected to conduits 115 and 114, respectively. The conduit 114 is fluidically connected to a head tank 20 via a check valve 21 and the conduit 115 is fluidically connected to the head tank 20 via a check valve 22. When the pedal 9 is depressed, the piston 111 is moved upwardly through the shaft 801 and link 808, whereby the check valve 21 is closed by the oil pressure generated in the conduit 114 and the oil pressure is supplied to the port 186 to urge the spool 181 to the left. At this time, the oil pressure in the conduit 115 becomes negative pressure due to the upward movement of the piston 111, whereby the check valve 22 is opened and oil in the head tank 20 flows into the conduit 115.

When the pedal 9 is released, the piston 111 is moved downwardly to generate the oil pressure in the conduit 115 through the port 112, and the oil pressure closes the check valve 22 and serves as a signal for a dynamic brake. At this time, the oil pressure in the conduit 114 becomes negative pressure due to the downward movement of the piston 111, whereby the check valve 21 is opened and oil in the head tank 20 flows into the conduit 114. When the piston 111 of the pedal speed responsive device 11 is further moved after the spool valve 181 of the changeover valve 18 is moved by the up-downward movement of the piston 111, a shuttle valve 1200 drains the oil pressure generated in the conduit 114 or in the conduit 115 to the reservoir 6.

In FIG. 7, when the pedal 9 is depressed in counterclockwise direction, the throttle degree of the valve 103 operatively connected with the pedal through members 801, 802, 803, 804, 805 and 806 is increased to advance the output of the engine. Thus increased power horse is applied as an acceleration power. At this time the link 808 operatively connected with the pedal 9 moves the piston 111 of the device 11 upward to generate oil pressure in the conduit 114. Due to the pressure in the conduit 114 the check valve 21 is closed and further the ball 1201 of the shuttle valve 1200 is moved to the right in FIG. 7.

Vacuum will then prevail in the conduit 115 to open the check valve 22 permitting the oil in the head tank 20 to flow into the conduit 115. The pressure in the conduit 114 is further transmitted to the oil pressure port 186 of the changeover valve 18 thereby displacing the spool valve 181 to the left as viewed in FIG. 7. Due to the displacement of the spool valve 181, the ball 192 of the detent 19 is received in the groove 192 for maintaining the spool valve 181 to its displaced position. Simultaneously the communication between ports 183 and 185 as well as between ports 182 and 187 is established; the pump pressure from the pump 5 is supplied to the bore of the slidable member 140 of the first servo means 14 through port 183, conduit 147, groove 143 and slot 148.

Due to the pressure in the member 140, the plunger 145 is moved toward the right to be engaged with the shoulder 149 and thereafter the cam follower 141 and the plunger 145 are integrally moved to the right thereby converting the rotational angle of the cam shaft 121 into a reciprocating displacement of the plunger 145. However, since the slot 158 of the second servo means 15 is in communication with the reservoir 6 through groove 153, conduit 157, and ports 182 and 187, the bore in the second slidable member 150 takes up any oil pressure and the member 150 is merely moved to the right not to move the plunger 155; i.e., the member 150 is merely moved in accordance with the cam action between the cam follower 151 and cam 124.

Under such conditions, the depression of the pedal 9 will cause the cam shaft 121 to rotate through elements 801, 802, 803, 804 and 809. The rotation of the cam shaft 121 will cause cam action between the first cam 122 and the first cam follower 141 thereby displacing the plunger 145, member 16, stem 161 thereof integrally toward the right to push the retainer 173.

Due to the rightward displacement of the retainer 173, the spool valve 171 of the servo valve 17 is moved to the right to establish communication between the ports 175 and 177 as well as between the ports 174 and 178. The oil constant pressure from the pressure source 5 is then introduced to the port 702 of the actuator 7 through ports 177, 175 and conduit 704. Thus will cause the piston 701 therein to move toward the right to reduce the drive ratio of the transmission 2. Such reduction of the drive ratio will also reduce the load of the engine 1, which facilitates the increase of the engine revolutional speed, readily reaches high horse power position, and which obtains better acceleration characteristics. Thus the engine revolutional speed is abruptly increased and accordingly the rotational speed of the output shaft 106 is increased through drive shaft 101, gears 104, 105 and the oil pressure in the conduit 401 is increased through the shaft 106 and the governor 4 connected thereto.

Thus the increased pressure in the conduit 401 is introduced into the port 170 of the servo valve 17 to return the spool valve 171 in the left direction. At this time, however, since the drive ratio of the transmission 2 has been reduced not to exert the load upon the engine 1, even when the leftward movement of the spool valve 171 reaches the balancing position where the land 179 thereof fully closes the port 177, the increasing of the engine rotational speed continues to further move the spool valve 171 to the left. Such further leftward movement of the spool valve 171 will establish the communication between the ports 177 and 174 as well as between a port 176 and the port 175.

The oil pressure from the pump 5 will be further introduced into the port 703 of the actuator 7 through ports 177, 174 and conduit 705, while the oil pressure through the ports 176 and 175 is drained to the reservoir 6 to continue the leftward movement of the spool 171 whereby the drive ratio of the transmission 2 will be increased to exert the load upon the engine 1. The engine revolutional speed is accordingly reduced to also reduce the oil pressure in the conduit 401 from the governor 4. Thus the spool 171 of the servo valve 17 is again moved to the right by the force of spring 172 until the land 179 of the spool valve 171 fully closes the port 177. The increase of the drive ratio of transmission 2, at this time, stops and the rotational speed of the engine 1 is positioned on the line 3003a in FIG. 3 to return to the normal running condition.

Under such normal conditions, if the vehicle is running on the sloped road maintaining the pedal depression in its same degree, an excess load is exerted upon the output 3 of the transmission 2, which may drop the rotational speed of the engine 1.

The pressure in the conduit 401 is, accordingly, reduced to move the spool valve 171 of the servo valve 17 to the right by the biasing force of spring 172 to reduce the drive ratio of transmission 2 thereby starting to reduce the load on engine 1 and to increase the rotational speed of the same. Therefore, the spool valve 171 will again move back by overcoming the force of spring 172. This will continue until the engine rotational speed reaches the aforementioned normal conditions (the line 3003a in FIG. 3).

If the driver of the vehicle wishes to reduce the vehicle speed during normal vehicle running, he first releases the pedal depression in the clockwise direction, which will reduce the opening degree of the throttle valve 103 operatively connected to the pedal 9 and accordingly the output power horse of the engine 1 is reduced. During such pedal releasing operation, in case the land 1007 of the spool valve of the device 10 maintains the position above the port 1004 even though the piston 111 of the device 11 operatively connected to the pedal 9 is moved downward to generate oil pressure at the port 112, the oil in the conduit 1005 is drained to the reservoir 6 through port 1008, while the oil pressure in the conduit 115 is introduced into the device 10 through port 1004 and then is further introduced into the port 186 of the changeover valve 18 through port 1003 of the device 10, conduit 1006, check valve 120 and through conduit 114. The changeover valve 18 is thus actuated to changeover operation. In FIG. 3 when the throttle degree $\theta$ of the throttle valve 103 is greater than the degree $\theta c$, then only the line 3003a exists within such areas.

Next, when the throttle degree $\theta$ is smaller than the degree $\theta c$, the land 1007 of the spool valve 1001 is positioned below the port 1004 to establish communication between ports 1002 and 1004 and to interrupt communication between ports 1004 and 1003. Under this condition when the pedal 9 is released, the piston 111 of the device 11 is moved downward. In accordance with the displacement speed thereof, the pressure at the port 112 is raised to close the check valve 22 and further to move the ball 1201 of the shuttle valve 1200 to the left, maintaining oil pressure in the conduit 115. The oil pressure in the conduit 115 is introduced into the port 184 of the changeover valve 18 through ports 1004 and 1002 and conduit 1005 to displace the spool valve 181 to the right. A part of the oil in the conduit 115 is drained through the relief valve 13. Due to the downward displacement of the piston 111 of the device 11, vacuum will prevail at the port 113 to open the check valve 21, and therefore, no pressure will exist in the conduit 114.

Due to the rightward displacement of the spool valve 181 of the changeover valve 18, the ball 192 of the detent 19 is received within the groove 194 to establish communication between ports 185 and 182 as well as between ports 188 and 183.

Thus, the pressure in the member 140 is now returned to the reservoir 6 through slot 148, groove 143, conduit 147 and ports 183 and 188, which will cause the first cam 122 not to transmit the action thereof to the plunger 145. To the contrary, the pressure in the pump 5 is introduced into the second slidable member 150 through ports 185 and 182, conduit 157, groove 153, and slot 158 of the second slidable member 150. Thus, the second plunger 155 is engaged with the shoulder 159 for unitary movement therewith to the right according to the cam action of the second cam 124.

Such conditions of the first and second servo means 14, 15 will be arranged upon initial releasing operation of the pedal 9.

When the opening degree of the throttle valve 103 is decreased and the output of the engine 1 is reduced due to the releasing of the pedal 9, only the second servo means 15 is operable in response to the second cam 124 to convert the rotational angle thereof into the reciprocable movement of the member 16 and the stem 161 thereof, and thus the retainer 173 is displaced in the position which corresponds to the engine rotational speed no.

During the pedal releasing, the cam shaft 121 is rotated in the clockwise direction to displace the retainer 173 of the servo valve 17 to the right, and therefore, to displace the spool valve 171 to the right by the compression force of spring 172 disposed therebetween. As described before, when the land 179 of the spool valve 171 is displaced to communicate the port 177 with the port 175, the drive ratio of the transmission 2 is decreased accordingly.

Due to the decrease of opening degree of throttle valve 103, as well as the reduction of engine output power horse, the output shaft 3 of the transmission 2 will drive the engine 1 by the force of inertia of the vehicle. The engine 1 is driven with high rotational speed in accordance with the reduction of the drive ratio of the transmission 2. Thus the pressure generated in the conduit 401 is raised to displace the spool valve 171 to the left through port 170. After the port 177 has been fully closed by the land 179 of the spool valve 171, the reduction of the gear ratio of the transmission is stopped.

This reduction of drive ratio is repeated during the pedal releasing operation and the engine rotational speed varies along the line 3003b in FIG. 3 and reaches the point B thereof where the maximum engine dynamic brake is applicable.

Now referring to FIG. 8 of the invention, the block X in FIG. 7 is replaced as in FIG. 8. The first cam follower 141 of a first servo means 14' is rightwardly and leftwardly moved by the rotation of the first cam 122. In the case that the first cam follower 141 is rightwardly moved by the rotation of the first cam 122, a preset urging force of a spring 142' becomes large and a spool valve 143' is rightwardly moved. Accordingly, the opening degree of a port 145' fluidically connected to the pump 5 becomes large and the opening degree of a port 144' fluidically connected to the reservoir 6 becomes small and the oil pressure within a conduit 148' fluidically connected to a port 146' is increased. A conduit 149' branching out from the conduit 148' serves as a feedback signal for leftwardly returning the spool valve 143' via a port 147'. The spool 143' is leftwardly fed back by the feedback signal until the oil pressure within the conduit 148' is balanced with the preset urging force of the spring 142', thereby correcting the oil pressure within the conduit 148'.

A second servo means 15' is the same construction as the first servo means 14'. A preset position of the second cam follower 151 rightwardly and leftwardly moved by the second cam 124 is replaced with an oil pressure signal as the first servo means 14' and the oil pressure is generated within a conduit 158' via a port 156'.

A spool valve 181' of a changeover valve 18' is moved leftwardly by the oil pressure within the conduit 114 showing an accelerating or driving state upon acceleration as shown, and ports 182', 184' are fluidically communicated. Accordingly, the port 148' and a conduit 173' of the servo valve 17 are fluidically communicated. Upon dynamic braking, the oil pressure is generated within the conduit 1005 and is fluidically transmitted to the port 184 of the changeover valve 18' and the spool valve 181' is moved rightwardly. Consequently, a port 182' is closed by the spool valve 181' and ports 183', 184' are fluidically communicated, so that the oil pressure within the conduit 158' is supplied to the conduit 173'.

When the oil pressure within the conduit 173' is larger than that within the conduit 401 of the governor 4 as shown in FIG. 7, the spool valve 171 of the servo valve 17 is moved rightwardly in FIG. 8 and the port 177 is fluidically communicated with the port 175 and the port 174 is fluidically communicated with the port 178, so that the oil pressure is generated within the conduit 704 and the oil pressure within the conduit 705 is discharged into the reservoir 6 and the drive ratio of the condinuously variable drive ratio transmission 2 is decreased as described in FIG. 7. When the oil pressure within the conduit 173' is smaller than that within the conduit 401, the spool valve 171 of the servo valve 17 is moved leftwardly and the port 175 is fluidically communicated with the port 176 and the port 174 is fluidically communicated with the port 177, so that the oil pressure within the conduit 704 is discharged into the reservoir 6 and the oil pressure is generated within the conduit 705 by the oil pressure of the constant pressure source 5 and the drive ratio of the continuously variable drive ratio transmission 2 is increased as described in FIG. 7.

The operation of FIG. 8 will now be described hereinbelow in detail.

When the pedal 9 is depressed upon driving, the piston 111 of the pedal speed responsive device 11 in FIG. 7 is moved up and the oil pressure is generated within the conduit 114 via the port 113. Accordingly, the oil pressure is supplied to the port 186 of the changeover valve 18' and the spool valve 181' is moved leftwardly in FIG. 8 and the port 183' is closed by the spool valve 181', so that the port 182' is fluidically communicated with the port 184' and the oil pressure within the conduit 148' of the first servo means 14' is supplied to the conduit 173' of the servo valve 17. At this time, the cam shaft 121 cooperating with the pedal 9 is rotated into the counter-clockwise direction, as the pedal 9 is depressed, and the first cam follower 141 of the first servo means 14' is moved rightwardly according to the rotation of the first cam 122. Consequently, the defined urging force of the spring 142' is strengthened and the spool valve 143' is moved rightwardly and the drain port 144' is narrowed and the port 145' is widened, so that the oil pressure from the pump 5 is forced into the port 145', port 144' is closed and pressure is generated at the port 146'. The pressure at the port 146' is determined by the balancing operation between the feedback pressure of the conduit 149' of the conduit 148' and the pre-set force of the spring 142'. Oil pressure proportional to the position of the first cam follower 141 acts on the left end surface of the spool valve 171 via the conduit 148', the port 182', the port 184' and the conduit 173', so that the spool valve 171 is moved rightwardly, the drive ratio of the continuously variable drive ratio transmission 2 thus being decreased and the rotational speed of the engine 1 increased. The operation described in FIG. 7 is repeated and is stable in normal condition. The rotational speed of the engine 1 in the normal condition is always in proportion to the position of the first cam follower 141.

When the pedal 9 begins to return within the range in which $\theta$ is smaller than $\theta c$ in FIG. 3, the oil pressure is generated within the conduit 1005 from the throttle degree detecting valve 10 and is transmitted to the port 184 of the changeover valve 18' in FIG. 8. Accordingly, the spool 181' is pressed rightwardly to the right end of the changeover valve 18 and the detent 19 is shifted from the position in FIG. 8. The port 182' is closed by the spool valve 181' and the port 183' is fluidically communicated with the port 184'. Only the oil pressure within the conduit 158' of the second servo means 15' is supplied to the conduit 173' of the servo valve 17.

At this time, the cam shaft 121 is rotated in the clockwise direction by returning the pedal 9 and the rotation of the second cam 124 determines the position of the second cam follower 151 in the same way as in the first servo means 14', and oil pressure proportional to the position of the second cam follower 151 is generated within the conduit 158' and is fluidically transmitted to the conduit 173' of the servo valve 17. The spool valve 171 of the servo valve 17 is moved rightwardly by the oil pressure within the conduit 173' as above described, so that the drive ratio of the continuously variable drive ratio transmission 2 is decreased and the engine rotational speed in dynamic braking condition is increased. And when the rotational speed of the engine 1 reaches point $no$ of line 3003b in FIG. 3, which is equivalent to the position of the second cam follower 151, it comes to a normal state.

Referring now to FIGS. 9A and 9B wherein a further or electrically operated modification of parts of the construction of FIG. 7 is illustrated, a circuit 60, which is a modification of the throttle degree detecting valve 10 of FIG. 7, comprises a potentiometer circuit 61, a comparison circuit 62 and a relay drive circuit 63. The potentiometer circuit 61 has a resistor 64 and a tap 65 to thereby generate an output positive voltage in proportion to the position of the tap 65 which is moved by the rod 92 of the pedal 9, comparable to the throttle degree of the throttle valve 103. The comparison circuit 62 includes an operation amplifier 66 having a non-inverting input terminal which is adapted for receiving the output positive voltage from the potentiometer 61, and an inverting input terminal which is adapted for receiving the output positive voltage from the potentiometer 61, and an inverting input terminal which is adapted for receiving a predetermined voltage corresponding to the predetermined throttle degree $\theta c$, the amplifier 66 being adapted to deliver an output voltage when the output voltage from the potentiometer 61 is higher than the predetermined voltage. The output voltage from the comparison circuit 62 is transmitted to a transistor 67 of the drive circuit 63 through a zener diode to cause the transistor 67 to conduct so that a relay 68 is driven so as to open a normally closed switch 69. As will be clear hereinbefore, the circuit 60 serves to open the switch 69 only when the throttle degree of the throttle valve is larger than the predetermined degree θc.

A circuit 600 is a modification of the pedal speed responsive device 11 of FIG. 7 and includes a sensor 601, comparison circuits 602 and 603 and relay drive circuits 604 and 605. The sensor 601 is of electromagnetic induction type having a coil 606 and a magnet 607, the magnet 607 being connected to the rod 92 of the pedal 9 and being moved up and down thereby so that an electromotive force is induced in response to the direction and speed of the movement of the magnet 607. Therefore, an induced current flows through the coil 606 and the corresponding voltage is transmitted to the comparison circuits 602 and 603 through an amplifier 608. More particularly, the magnet 607 is moved downwardly when the pedal 9 is depressed so that a positive voltage +E in proportion to the released speed of the pedal 9 is transmitted to the comparison circuits 602 and 603.

The comparison circuit 602 has an operation amplifier 609 which compares the positive voltage E transmitted to its non-inverting input terminal and a predetermined voltage +Ed transmitted to its inverting input terminal. The comparison circuit 603 has an operation amplifier 610 which compares the negative voltage −E transmitted to its inverting input terminal and the predetermined voltage −Eb transmitted to its non-inverting input terminal. If +E>+Ed, the comparison circuit 602 delivers an output voltage to thereby cause a transistor 611 of the relay drive circuit 604 to conduct and thus a relay 612 is driven to open a normally closed switch 621. If −E>−Eb and the switch 69 is in its closed position, the comparison circuit 603 delivers an output voltage to thereby cause a transistor 613 of the relay drive circuit 605 to conduct and thus a relay 614 is driven to close a normally open switch 622. When the switch 69 is maintained at its open position by the circuit 60, no output voltage is transmitted to the circuit 605.

A circuit 620 is a modification of the detent 19 of FIG. 7 and constitutes a flip-flop circuit to control the operation of a solenoid valve assembly 630, as shown in FIG. 9B, in response to output voltages or signals from the circuit 600. The circuit 620 comprises a battery 623, magnetic coils 624 and 625, a switch 626 and the switches 621 and 622. When the switch 622 is closed by the output voltage from the circuit 605, both of the solenoid coils 624 and 625 are energized, and the normally open switch 626 is closed. Therefore, the solenoid coil 625 is maintained at its energizing condition even when the switch 622 is thereafter opened.

When the switch 621 is opened by the output voltage from the circuit 604, the solenoid coils 624 and 625 are de-energized so that the switch 626 is opened. Under the above conditions, the solenoid coil 625 is maintained at its de-energizing condition even when the switch 621 is again closed.

The solenoid valve assembly 630 is a modification of the changeover valve 18 of FIG. 7 wherein same parts are designated by the same reference numbers. The spool valve 181 is moved toward the left against a spring 631 when the solenoid coil 625 is energized by the circuit 620 and a plunger 632 is moved toward the left, so that the conduit 157 for dynamic brake is connected to the pump 5. When the solenoid coil 625 is de-energized by the circuit 620, the spool valve 181 is returned toward the right by the spring 631 so that the conduit 147 for drive operation is connected to the pump 5.

As will be clear hereinbefore, so long as the parts of FIG. 9A are in their illustrated positions, the coil 625 is in its de-energizing condition whereby the conduit 147 is connected to the pump 5. Under these conditions, the coil 625 is energized only when the switch 622 is closed by the output voltage from the circuit 605, in other words, only when the pedal 9 is suddenly released from the condition wherein the throttle degree is the same as or less than the predetermined degree θc, whereby the conduit 157 is connected to the pump 5. From this stage, it will be also apparent that the coil 625 is de-energized, again, only when the switch 621 is opened, namely, only when the pedal 9 is suddenly depressed.

Figure 10:
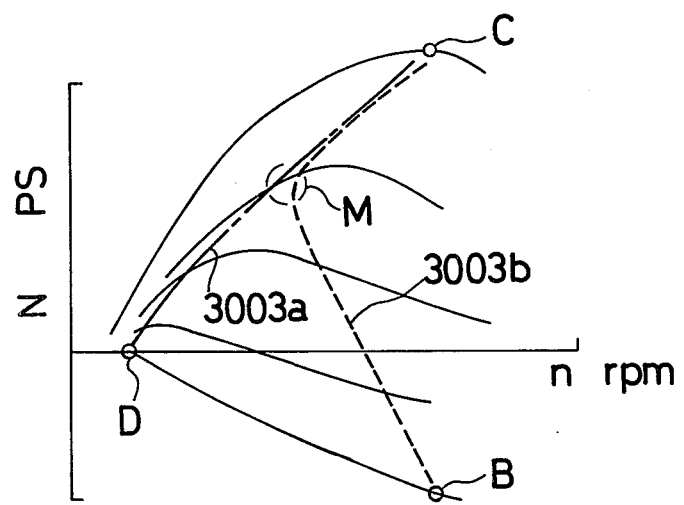
FIG. 10 is a diagram showing an engine characteristic and a control method therefor in a way different from the foregoing embodiments.

In order to get the control of transmission according to FIG. 10, the circuit 60 may be omitted from the construction of FIG. 9A and therefore the comparison circuit 603 may be directly connected to the circuit 605 eliminating the switch 69. The construction and operation thereof, therefore, will be easily understood and the explanation thereof will be omitted.

It will be apparent also that when the conduit 115 is connected to the conduit 1005 in FIG. 7, it is unnecessary to provide the throttle valve detecting valve 10 and the check valve 120 so as to realize the characteristics as shown in FIG. 10.

What is claimed is:
1. A method for controlling a continuously variable drive ratio transmission between a prime mover operable by a single pedal and an output shaft including means for varying the drive ratio between the prime mover and the drive shaft so as to maintain a predetermined relationship between any two of the three factors: the throttle degree, the speed, and the output torque of the prime mover comprising the steps of
predetermining a first curve defining a desired speed of the prime mover for any setting of the pedal during depression of the pedal for acceleration;
predetermining a second curve defining a desired speed of the prime mover for any setting of the pedal during release of the pedal for dynamic braking;
detecting the operational condition of the pedal,
continuously monitoring the speed of the prime mover;
comparing the speed of the prime mover with the first curve or the second curve as determined by the detected operational condition of the pedal; and
adjusting the drive ratio varying means toward a null as determined by said comparing means.
2. The method of claim 1 wherein the step of comparing includes the steps of
incorporating said first curve and said second curve into first and second cam surfaces respectively;
rotating said cam surfaces as a function of the movement of said pedal;
positioning movable elements individual to each of said cam surfaces;
continuously developing a pressure analagous to the speed of the prime mover; and
resiliently applying said pressure against one of said individual elements as determined by the detected operational condition of the pedal.

3. In a system including a prime mover provided with a fuel supply device for controlling the horse power thereof, a personally operable pedal for controlling said device of the prime mover, and a continuously variable drive ratio transmission adapted to be driven by said prime mover and provided with means for varying the drive ratio between said prime mover and a drive shaft so as to maintain a predetermined relationship between any two of the three factors: the throttle degree, the speed and the output of the prime mover, the improvement comprising in combination means for detecting the operational condition of said personally operable pedal;

drive control means for controlling the drive ratio of said transmission to retain a first predetermined relationship between the throttle degree and the speed of the prime mover;

dynamic brake control means for controlling the drive ratio of said transmission to retain a second predetermined relationship between the throttle degree and the speed of the prime mover; and changeover means for selecting said drive control means, or said dynamic brake control means in response to the operational condition of pedal detected by said detecting means.

4. The improvement of claim 3 wherein said drive control means includes first cam means controlled by the depression of said pedal, said first cam means including a cam surface defining a desired speed for the prime mover for any setting of the pedal during depression of the pedal; wherein said dynamic brake control means includes second cam means controlled by the release of said pedal, said second cam means including a cam surface defining a desired speed for the prime mover for any setting of the pedal during release of the pedal; and wherein said drive control means and said dynamic brake control means include means for comparing said desired speeds with the speed of the prime mover.

* * * * *